US011125696B2

(12) United States Patent
Butcher et al.

(10) Patent No.: US 11,125,696 B2
(45) Date of Patent: Sep. 21, 2021

(54) COLORIMETRIC ANALYZER WITH DE-BUBBLING

(71) Applicant: Rosemount Inc., Shakopee, MN (US)

(72) Inventors: Bradley A. Butcher, La Verne, CA (US); Chang-Dong Feng, Long Beach, CA (US)

(73) Assignee: Rosemount Inc., Shakopee, MN (US)

( * ) Notice: Subject to any disclaimer, the term of this patent is extended or adjusted under 35 U.S.C. 154(b) by 830 days.

(21) Appl. No.: 14/626,050

(22) Filed: Feb. 19, 2015

(65) Prior Publication Data

US 2015/0233838 A1   Aug. 20, 2015

Related U.S. Application Data

(60) Provisional application No. 61/942,252, filed on Feb. 20, 2014.

(51) Int. Cl.
*G01N 21/78* (2006.01)
*G01N 21/25* (2006.01)
(Continued)

(52) U.S. Cl.
CPC ............. *G01N 21/78* (2013.01); *G01N 21/11* (2013.01); *G01N 21/251* (2013.01); *G01N 21/03* (2013.01);
(Continued)

(58) Field of Classification Search
CPC ....... G01N 2021/054; G01N 2021/752; G01N 21/03; G01N 21/11; G01N 21/251; G01N 21/78; Y10T 436/117497
See application file for complete search history.

(56) References Cited

U.S. PATENT DOCUMENTS 3,874,850 A    4/1975  Sorenson et al.
5,550,053 A *  8/1996  Salpeter ............... G01N 21/274
                                                        250/252.1
(Continued)

FOREIGN PATENT DOCUMENTS

EP          1482298 A1    12/2004

OTHER PUBLICATIONS

Second Office Action for Chinese Patent Application No. 201580000568.6, dated Nov. 29, 2017, 18 pages including English Translation.
(Continued)

*Primary Examiner* — Samuel P Siefke
(74) *Attorney, Agent, or Firm* — Christopher R. Christenson; Kelly, Holt & Christenson PLLC

(57) ABSTRACT

A colorimetric analyzer includes a reaction chamber configured to receive a sample and at least one reagent. A measurement cell is operably coupled to the reaction chamber. The measurement cell has an illumination source and an illumination detector spaced from the illumination source such that illumination from the illumination source passes through the reacted sample to the illumination detector. A controller is coupled to the illumination source and the illumination detector. The controller is configured to generate an analytic output based on a signal from the illumination detector. A fill conduit is operably interposed between the reaction chamber and the measurement cell. The fill conduit is configured to reduce bubbles.

8 Claims, 3 Drawing Sheets

(51) Int. Cl.
  *G01N 21/11* (2006.01)
  *G01N 21/75* (2006.01)
  *G01N 21/05* (2006.01)
  *G01N 21/03* (2006.01)

(52) U.S. Cl.
  CPC . *G01N 2021/054* (2013.01); *G01N 2021/752* (2013.01); *Y10T 436/117497* (2015.01)

(56) References Cited

U.S. PATENT DOCUMENTS

| | | | |
|---|---|---|---|
| 7,333,194 B2 | 2/2008 | Juanakais et al. | |
| 2005/0187439 A1* | 8/2005 | Blank | A61B 5/0075 600/310 |
| 2010/0196945 A1 | 8/2010 | Forsell | |
| 2011/0318767 A1 | 12/2011 | Takagi et al. | |
| 2012/0293796 A1* | 11/2012 | Ludowise | B01L 3/5027 356/244 |
| 2015/0099304 A1 | 4/2015 | Butcher et al. | |

OTHER PUBLICATIONS

Dennis Desheng Meng et al., "A degassing plate with hydrophobic bubble capture and distributed venting for microfluidic devices" Journal of Micromechanics and Microengineering, vol. 16, pp. 419-424, Jan. 19, 2006.
Third Office Action dated Jun. 11, 2018, for Chinese Patent Application No. 201580000568.6, 16 pages including English translation.
Fourth Office Action dated Jan. 11, 2019 for Chinese Patent Application No. 201580000568.6, 26 pages including English translation.
International Search Report and Written Opinion for International Application No. PCT/US2015/016556, dated May 22, 2015, filed Feb. 19, 2015, 12 pages.
International Search Report and Written Opinion for International Application No. PCT/US2014/058785, dated Jan. 9, 2015, filed Oct. 2, 2014, 11 pages.
International Preliminary Report on Patentability for International Application No. PCT/US2015/016556, dated Sep. 1, 2016, filed Feb. 19, 2015, 8 pages.
First Office Action for Chinese Patent Application No. 201580000568. 6, dated Mar. 2, 2017, 12 pages including English translation.

* cited by examiner

COLORIMETRIC ANALYZER WITH DE-BUBBLING

CROSS-REFERENCE TO RELATED APPLICATION

The present application is based on and claims the benefit of U.S. Provisional Patent Application Ser. No. 61/942,252, filed Feb. 20, 2014, the content of which is hereby incorporated by reference in its entirety.

BACKGROUND

Online wet chemistry analyzers are used in a variety of industries to provide a continuous indication of an analyte in a process sample. This continuous indication can be provided locally by the analyzer and/or remotely to one or more suitable devices in order to provide control and/or monitoring of a chemical process.

One particular example of an online wet chemistry analyzer is an online automatic colorimetric analyzer. Such devices are configured to generate a reaction in the process sample that creates a visual indication relative to the process sample. This visual indication is measured by an optical sensor or light detector in order to provide an indication relative to the reaction. One particular example of an automatic colorimetric analyzer is an online silica analyzer that employs a known reaction to render the silica in the process sample readily detectable. One example of such reaction is known as the molybdenum blue method. In the molybdenum blue method, molybdate (usually in the form of potassium molybdate) is used to react with silica in the process sample in order to generate a compound suitable for colorimetric detection. In accordance with the molybdenum blue method, the silica content in water is measured based on the color of the silicomolybdic acid formed through the wet chemistry process.

In online wet chemistry analyzers that utilize optical measurement techniques, it is important to facilitate an effective optical measurement. Aspects or properties of the sample that may interfere with the optical measurement that are not related to the presence or concentration of the analyte, generate measurement errors. Therefore, identifying and/or reducing such artifacts is beneficial in order to obtain higher precision and fidelity in optical colorimetric measurements.

SUMMARY

A colorimetric analyzer includes a reaction chamber configured to receive a sample and at least one reagent. A measurement cell is operably coupled to the reaction chamber. The measurement cell has an illumination source and an illumination detector spaced from the illumination source such that illumination from the illumination source passes through the reacted sample to the illumination detector. A controller is coupled to the illumination source and the illumination detector. The controller is configured to generate an analytic output based on a signal from the illumination detector. A fill conduit is operably interposed between the reaction chamber and the measurement cell. The fill conduit is configured to reduce bubbles.

DETAILED DESCRIPTION

In automatic colorimetric analyzers, one of the challenges for analyzer design is the elimination of bubbles while filling the optical cuvette with sample. Any bubbles stuck to the wall of the cuvette will deflect light and thus affect the accuracy of the optical measurement. In accordance with various embodiments set forth below, the portion of the analyzer upstream of the optical cuvette is configured to reduce or eliminate the formation or presence of bubbles such that the sample that reaches the optical cuvette is substantially bubble-free.

Figure 1:
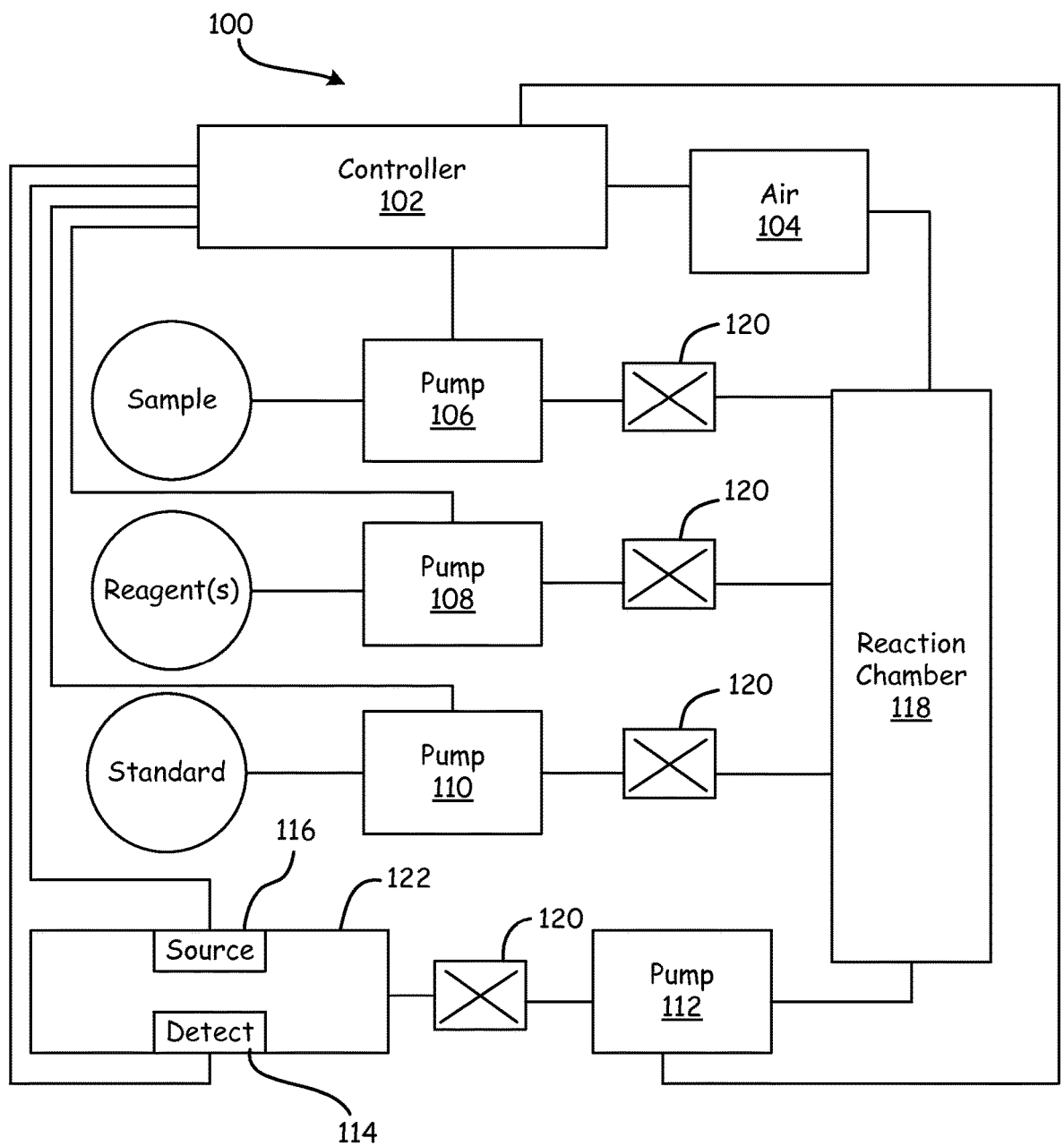
FIG. 1 is a diagrammatic view of an online silica analyzer with which embodiments of the present invention are particularly useful.

FIG. 1 is a diagrammatic view of an online silica analyzer with which embodiments of the present invention are particularly useful. Analyzer 100 includes controller 102 that is coupled to air source 104, pumps 106, 108, 110, and 112. Additionally, controller 102 is also coupled to illumination source 114 and illumination detector 116. Typically, each pump 106, 108, 110, and 112 is a peristaltic pump that employs peristaltic action to move its respective liquid. Cavity volumes are typically 2.5 mL for sample and standards (pumps 106 and 110) and 0.2 mL for reagents (pump 108). However, any suitable volumes can be used for the sample, standards, and reagents. A number of check valves 120 are provided in order to prevent backflow. When mixing of the sample/reagent/standards is desired, controller 102 engages air source 104 to pump a quantity of air into reaction chamber 118 in order to mix the contents therein. After a suitable reaction time has passed, the treated sample is pumped, using pump 112, to measurement cell 122. Once the mixed sample is provided within measurement cell 122, controller 102 engages illumination source 114 to direct light through the mixed sample toward detector 116. In accordance with known techniques, the illumination detected by detector 116 provides an indication of the analyte in the sample. For example, for silica, controller 102 automatically calculates the absorbance and translates the results into a silica concentration reading. Once the measurement is complete, repeated flushes with fresh sample remove the treated sample from the measurement and reaction cells, 122 and 118, respectively.

Figure 2:
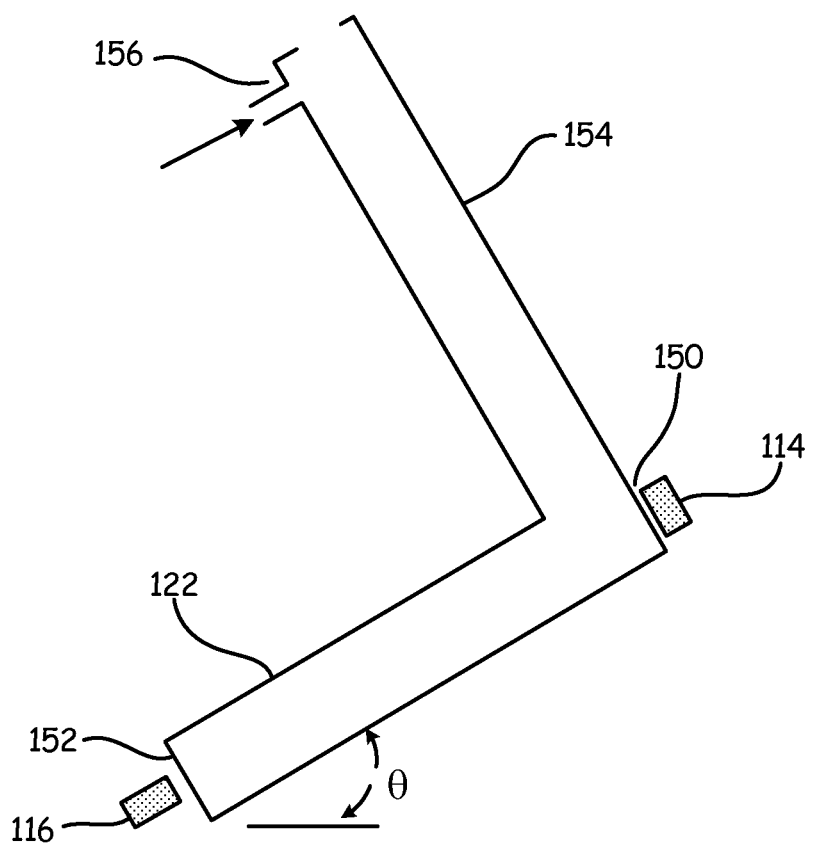
FIG. 2 is a diagrammatic view of a portion of an automatic colorimetric analyzer in accordance with an embodiment of the presence invention.

FIG. 2 is a diagrammatic view of a portion of an automatic colorimetric analyzer in accordance with an embodiment of the presence invention. Measurement cell 122 is, in one embodiment, disposed at an angle θ with respect to gravity. Light detector 116 is disposed proximate one end 150 of measurement cell 122 while light source 114 is disposed proximate other end 152 of measurement cell 122. A sample fill conduit 154 is coupled to measurement cell 122 proximate end 150. As illustrated in FIG. 2, sample fill conduit 154 is also preferably disposed at a non-zero angle that is less than 90 degrees with respect to gravity such that sample introduced at sample inlet 156 will generally run along the inner diameter of sample conduit 154. In one embodiment θ+α sum to about 90 degrees, with each angle being greater than zero.

In accordance with an embodiment of the present invention, sample conduit 154 is formed or includes, at its inner diameter, a hydrophobic material. In some embodiments, conduit 154 may be formed entirely of a hydrophobic material. In other embodiments, sample fill conduit 154 may be formed of any material but provided with a hydrophobic layer at its internal diameter. While any particular hydrophobic material can be used, in one embodiment, conduit 154 is formed of a hydrophobic polymer. More particularly, the polymer may be Poly(methyl methacrylate). By providing a hydrophobic surface within sample fill conduit 154, the sample will trickle or otherwise flow down along the inside of sample fill conduit 154 before flowing into the optical cuvette. Any bubble in the sample solution will be eliminated or otherwise reduced by the hydrophobic surface within sample fill conduit 154 so that measurement cell 122 can be filled with bubble-free sample. As used herein, reducing bubbles is defined to mean reducing the formation or presence of bubbles in fill conduit 154. Accordingly, such bubble reduction eliminates at least some bubbles before the bubbles can reach measurement cell 122. This is important because if a bubble were to become trapped inside the optical cuvette, the bubble would deflect light from the measurement beam and interfere with the proper illumination detection.

Figure 3:
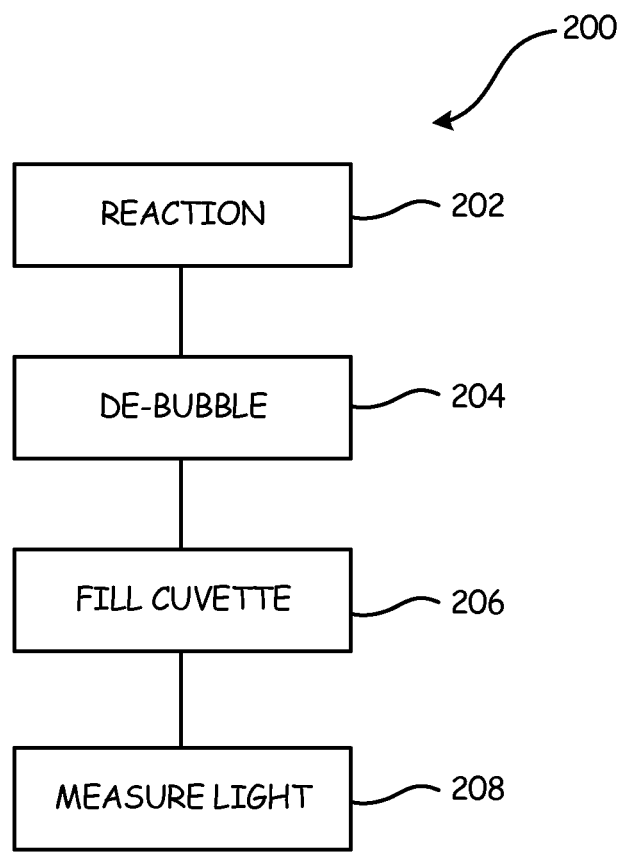
FIG. 3 is a flow diagram of a method of processing a sample in an automatic colorimetric analyzer in accordance with the embodiment of the presence invention.

FIG. 3 is a flow diagram of a method of processing a sample in an automatic colorimetric analyzer in accordance with the embodiment of the presence invention. Method 200 begins at block 202 where the sample is subjected to a reaction to generate an optical property that is related to the analyte of interest. For example, in the analysis of silica, the known molybdenum blue reaction is used. However, those skilled in the art will appreciate that other reactions can be used in order to identify and/or quantify other analytes of interest. Regardless, once the reaction has progressed sufficiently, the sample is subjected to de-bubbling operation 204 that eliminates or reduces bubbles in the sample. In one embodiment, this de-bubbling operation occurs by passing the reacted sample over a hydrophobic surface in order to eliminate or otherwise reduce bubbles in the sample. Additionally, it is preferred that this bubble reduction operation occur substantially immediately before the sample is conveyed into an optical measurement cell or cuvette. Next, at block 206, the sample is introduced into a measurement cell or cuvette. In some embodiments, the sample may substantially fill the optical measurement cell, while in other embodiments, at least some analysis may take place with the cuvette being partially filled. At block 208, a light source, such as light source 114, is engaged and a detector, such as detector 116, is used to detect light from the light source passing through the de-bubbled, reacted sample. Based on the signal from the detector, an optical property relative to the color of the reacted sample is ascertained. Based on this property, controller 102 (shown in FIG. 1) provides an analytic output indicative of the analyte of interest.

Although the present invention has been described with reference to preferred embodiments, workers skilled in the art will recognize that changes may be made in form and detail without departing from the spirit and scope of the invention.

What is claimed is:

1. A colorimetric analyzer comprising:
    a reaction chamber configured to receive a sample and at least one reagent;
    a measurement cell operably coupled to the reaction chamber, the measurement cell having an illumination source and an illumination detector spaced from the illumination source such that illumination from the illumination source passes through the reacted sample to the illumination detector;
    a controller coupled to the illumination source and the illumination detector, the controller being configured to generate an analytic output based on a signal from the illumination detector; and
    a fill conduit operably interposed between the reaction chamber and the measurement cell, the fill conduit comprising a first material and a fluidically-sealed, hydrophobic second material disposed along an inner diameter of the first material.

2. The colorimetric analyzer of claim 1, wherein the hydrophobic second material is formed of a polymer.

3. The colorimetric analyzer of claim 2, wherein the polymer is Poly(methyl methacrylate).

4. The colorimetric analyzer of claim 1, wherein the fill conduit is disposed at a non-zero angle that is less than 90 degrees with respect to gravity.

5. The colorimetric analyzer of claim 1, wherein both the first and second materials comprise a hydrophobic material.

6. The colorimetric analyzer of claim 5, wherein the hydrophobic material comprises Poly(methyl methacrylate).

7. The colorimetric analyzer of claim 1, and further comprising a peristaltic pump disposed between the reaction chamber and the fill conduit, wherein the peristaltic pump is configured to convey reacted sample into a sample inlet of the fill conduit.

8. The colorimetric analyzer of claim 1, wherein the colorimetric analyzer is a silica analyzer.

* * * * *